United States Patent
Gantman et al.

(10) Patent No.: US 9,697,359 B2
(45) Date of Patent: Jul. 4, 2017

(54) SECURE SOFTWARE AUTHENTICATION AND VERIFICATION

(71) Applicant: QUALCOMM Incorporated, San Diego, CA (US)

(72) Inventors: Alexander Gantman, Solana Beach, CA (US); David Merrill Jacobson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/687,783

(22) Filed: Apr. 15, 2015

(65) Prior Publication Data
US 2016/0306976 A1   Oct. 20, 2016

(51) Int. Cl.
| | |
|---|---|
| G06F 21/57 | (2013.01) |
| G06F 21/44 | (2013.01) |
| G06F 21/51 | (2013.01) |
| G06F 21/64 | (2013.01) |
| H04L 9/32 | (2006.01) |

(52) U.S. Cl.
CPC ........... *G06F 21/572* (2013.01); *G06F 21/44* (2013.01); *G06F 21/51* (2013.01); *G06F 21/575* (2013.01); *G06F 21/64* (2013.01); *H04L 9/3242* (2013.01); *H04L 9/3247* (2013.01); *G06F 2221/033* (2013.01)

(58) Field of Classification Search
CPC ........ G06F 21/572; G06F 21/44; G06F 21/51; G06F 21/575; G06F 21/12; G06F 21/64; H04L 9/3242; H04L 9/3247; H04L 9/3281
See application file for complete search history.

(56) References Cited

U.S. PATENT DOCUMENTS

| | | | | |
|---|---|---|---|---|
| 5,734,819 | A | * | 3/1998 | Lewis ............... G06F 21/121 380/45 |
| 8,571,223 | B2 | | 10/2013 | Du et al. |
| 8,745,371 | B2 | | 6/2014 | Obligacion |
| 8,792,645 | B2 | | 7/2014 | Schmit et al. |

(Continued)

FOREIGN PATENT DOCUMENTS

EP            1645931 A1      4/2006

OTHER PUBLICATIONS

International Search Report and Written Opinion—PCT/US2016/023631—ISA/EPO—Jun. 2, 2016.

(Continued)

*Primary Examiner* — Jung Kim
*Assistant Examiner* — Carlos M De Jesus Lassala
(74) *Attorney, Agent, or Firm* — Won Tae C. Kim

(57) ABSTRACT

A first time software is loaded for execution by a device, the software stored in non-secure storage is authenticated. Authenticating the software may involve a cryptographic operation over the software and a digital signature of the software. A verification tag may be generated for the software if authentication of the software is successful, the verification tag based on the software and at least a device-specific secret data. The verification tag may be stored within the device. Each subsequent time the software is loaded for execution it may be verified (not authenticated) by using the verification tag to confirm that the software being loaded is the same as the one used to generate the verification tag while avoiding authentication of the software.

22 Claims, 7 Drawing Sheets

(56) References Cited

U.S. PATENT DOCUMENTS

| | | | | |
|---|---|---|---|---|
| 2008/0133929 A1* | 6/2008 | Gehrmann | ............ | G06F 21/51 |
| | | | | 713/179 |
| 2008/0279373 A1* | 11/2008 | Erhart | .................. | H04L 9/302 |
| | | | | 380/46 |
| 2009/0144430 A1* | 6/2009 | Thambrahalli | ... | H04L 29/12594 |
| | | | | 709/227 |
| 2009/0193211 A1* | 7/2009 | Hu | ..................... | G06F 21/575 |
| | | | | 711/163 |
| 2013/0094648 A1* | 4/2013 | Goettfert | ................ | H04L 9/28 |
| | | | | 380/28 |
| 2013/0212383 A1* | 8/2013 | Hallin | ................ | H04L 9/3268 |
| | | | | 713/158 |
| 2014/0247944 A1 | 9/2014 | Kocher et al. | | |
| 2014/0250290 A1 | 9/2014 | Staahl et al. | | |
| 2015/0026826 A1* | 1/2015 | Allegri | ................. | H04L 63/10 |
| | | | | 726/29 |

OTHER PUBLICATIONS

Leest V V D., et al., "Anti-Counterfeiting with Hardware Intrinsic Security", Design, Automation & Test in Europe Conference & Exhibition (Date), 2013, IEEE, Mar. 18, 2013, pp. 1137-1142, XP032395890, DOI: 10.7873/DATE.2013.238 ISBN : 978-1-4673-5071-6 the whole document.

* cited by examiner

SECURE SOFTWARE AUTHENTICATION AND VERIFICATION

BACKGROUND

Field

Various features disclosed herein pertain generally to authentication of software to mitigate hacking of software in devices lacking secure storage, and more particularly, to a method in which software authentication is performed the first time the software is to be executed and a more efficient software verification is performed thereafter.

Background

Devices, such as mobile phones, mobile devices, pagers, wireless modems, personal digital assistants, tablets, personal information managers (PIMs), personal media players, palmtop computers, laptop computers, or any other device with a processor are becoming increasingly popular and ubiquitous. Data generated, entered, stored, and/or received at such devices should be secured against unauthorized access. One such risk of unauthorized access to data in a device includes the software running on the device which may have been modified (e.g., hacked) to permit such unauthorized access. Consequently, software operating on a device should be authenticated to make sure it has not been modified. Authentication of software on devices serves to prevent modified software from being executed on those devices. That is, the software may be authenticated as it is loaded, prior to execution, to verify that it has not been compromised (e.g., modified). Software authentication is particularly important where devices do not have secure or trusted internal storage to securely store the software. Software developers may use cryptography to digitally sign their software before being distributed to devices. Where a symmetric key is used to sign the software, each device receives such symmetric key to authenticate the software. However, using the same symmetric key for the software on all devices is risky because if a single device is compromised to obtain such symmetric key, then all other devices are exposed. While per device symmetric keys may be used to sign the software for each device, this approach may require management of a large number of symmetric keys and is thus cumbersome to implement. Alternatively, private/public key cryptography may be used by signing the software with a private key and distributing the corresponding public key to devices to authenticate the software. However, using a public key for authentication is processing intensive and difficult for many devices that are low-power or have minimal processing capabilities/resources. Thus, the private/public key approach is not a practical solution.

Consequently, there is a need for a solution that permits effectively authenticating software operating on devices of varying processing capabilities.

SUMMARY

A first aspect provides a method for verifying software during loading within a device. A software stored in a non-secure storage within the device or external to the device is obtained. In one example, the software may be part of an operating system being loaded at boot time of the device. When the software is loaded for execution, an attempt may be made to verify the software by using a pre-generated verification tag to confirm that the software being loaded is the same as the one used to generate the pre-generated verification tag while avoiding an authentication of the software. The pre-generated verification tag may be obtained from a previous authentication of the software. If such verification is successful, then the software is executed.

Otherwise, if verification fails or no pre-generated verification tag is available, then the software is authenticated when it is loaded for execution by the device. Note that verifying the software may be less time consuming and/or less resource intensive than authenticating the software. If authentication of the software is successful, a new verification tag for the software is generated based on the software and a device-specific secret data. The secret data may be known only to the device and/or is inaccessible outside the device. For instance, the secret data may be obtained based on a physically unclonable function within the device. The new verification tag may then be stored 614. In some examples, the pre-generated verification tag and/or the new verification tag may be stored in the non-secure storage or a different non-secure storage within the device or external to the device.

In one example, the software may be authenticated and, upon successful authentication, the pre-generated (e.g., initial, first, prior, etc.) verification tag may be generated. The pre-generated verification tag may be stored for use in the subsequent verification of the software.

In one example, authenticating the software may involve a cryptographic operation over the software and a cryptographic signature of the software. For instance, authenticating the software may include using a public key to authenticate the software using a signature over the software.

In another example, generating the new verification tag may include generating a message authentication code (MAC) over the software and using the device-specific secret data.

In some implementations, the new verification tag may be further generated based on device data that changes every time a new version of the software is obtained. The device data may never repeat when generating a new verification tag for software in the device.

If authentication of the software fails, execution of the software is aborted. In one implementation, the software is executed only if the verification of the software is successful or the authentication of the software is successful.

A new version of the software may be obtained. The new version of the software may be authenticated when it is loaded for execution by the device. If authentication of the new version of the software is successful, another verification tag (e.g., a second verification tag) may be generated for the new version of the software, where the another verification tag may be based on the new version of the software and at least the device-specific secret data or another device-specific data. The another verification tag may also be stored for subsequent use. Subsequently, the new version of the software may be verified when it is loaded for execution by using the another verification tag to confirm that the new version of the software being loaded is the same as the one used to generate the another verification tag while avoiding a re-authentication of the new version of the software.

According to another feature, the verification tag may be further bound by a revocable certificate that may serve to disable a verification tag. For instance, the revocable certificate may be checked by the device upon performing verification. The device may query a certificate revocation database, and verification would fail if the certificate has be revoked. So, even if the software has not been modified, verification would still fail if the corresponding certificate has been revoked.

Another aspect provides a device configured to perform a hybrid software authentication and verification prior to execution. The device may comprise a storage device and a processing circuit. The storage device may serve to store authentication instructions and/or verification tag generation instructions and verification tag comparison instructions. The processing circuit may be configured to obtain (e.g., retrieve, read, etc., via a bus or from a communications interface) software stored in a non-secure storage within the device or external to the device.

The verification tag comparator module/circuit may serve to attempt to verify the software when it is loaded for execution by using a pre-generated verification tag (e.g., stored among software verification tags) to confirm that the software being loaded is the same as the one used to generate the verification tag while avoiding an authentication of the software. If verification fails or no pre-generated verification tag is available, then the software authentication module/circuit may serve to authenticate the software when it is loaded for execution by the device. If authentication of the software is successful, the verification tag generator module/circuit may serve to generate a new verification tag for the software based on the software and a device-specific secret data. The new verification tag may then be stored among the software verification tag(s). This process achieves improvements in efficiency as verification of the software is less time consuming and/or less resource intensive than authentication of the software. Consequently, even though authentication may consume more time or resource initially, subsequent loadings of the software are more prompt and efficient due to using verification instead of authentication.

The device may also include a plurality of one-time blow fuses coupled to the processing circuit, wherein the new verification tag and/or pre-generated verification tag is further generated based on states from the one-time blow fuses, and the plurality of one-time blow fuses change every time an updated version of the software is obtained.

DETAILED DESCRIPTION

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail, in other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation.

Overview

One feature provides secure loading and execution of software by using a hybrid authentication and verification process on a host device. The software may be stored in non-secure storage. Initially, the first time the software is loaded for execution, it may be cryptographically authenticated. A verification tag may then be generated using the software and a device-specific secret data. When the software is subsequently loaded for execution, the verification tag is used to verify the software as it is loaded. If such verification fails, then loading and/or execution of the software may be aborted.

In one example, software stored in a non-secure storage within the device or external to the device may be obtained (e.g., retrieved, read, etc.). When loaded for execution (by a processing circuit), an attempt may be made to verify the software by using a pre-generated verification tag to confirm that the software being loaded is the same as the one used to generate the pre-generated verification tag while avoiding an authentication of the software. For instance, the processing circuit may attempt to use any and/or all verification tags available to it to verify the software. Alternatively, the processing circuit may check whether any verification tags are available prior to attempting to verify the software. If verification fails or no pre-generated verification tag is available, then the software may be authenticated when it is loaded for execution by the device. If authentication of the software is successful, a new verification tag for the software may be generated based on the software and a device-specific secret data. The new verification tag may be stored for subsequent verifications. The software is executed only if the verification of the software is successful or the authentication of the software is successful. Verification of the software is less time consuming and/or less resource intensive than authentication of the software.

Exemplary Software Authentication and Verification

Figure 1:
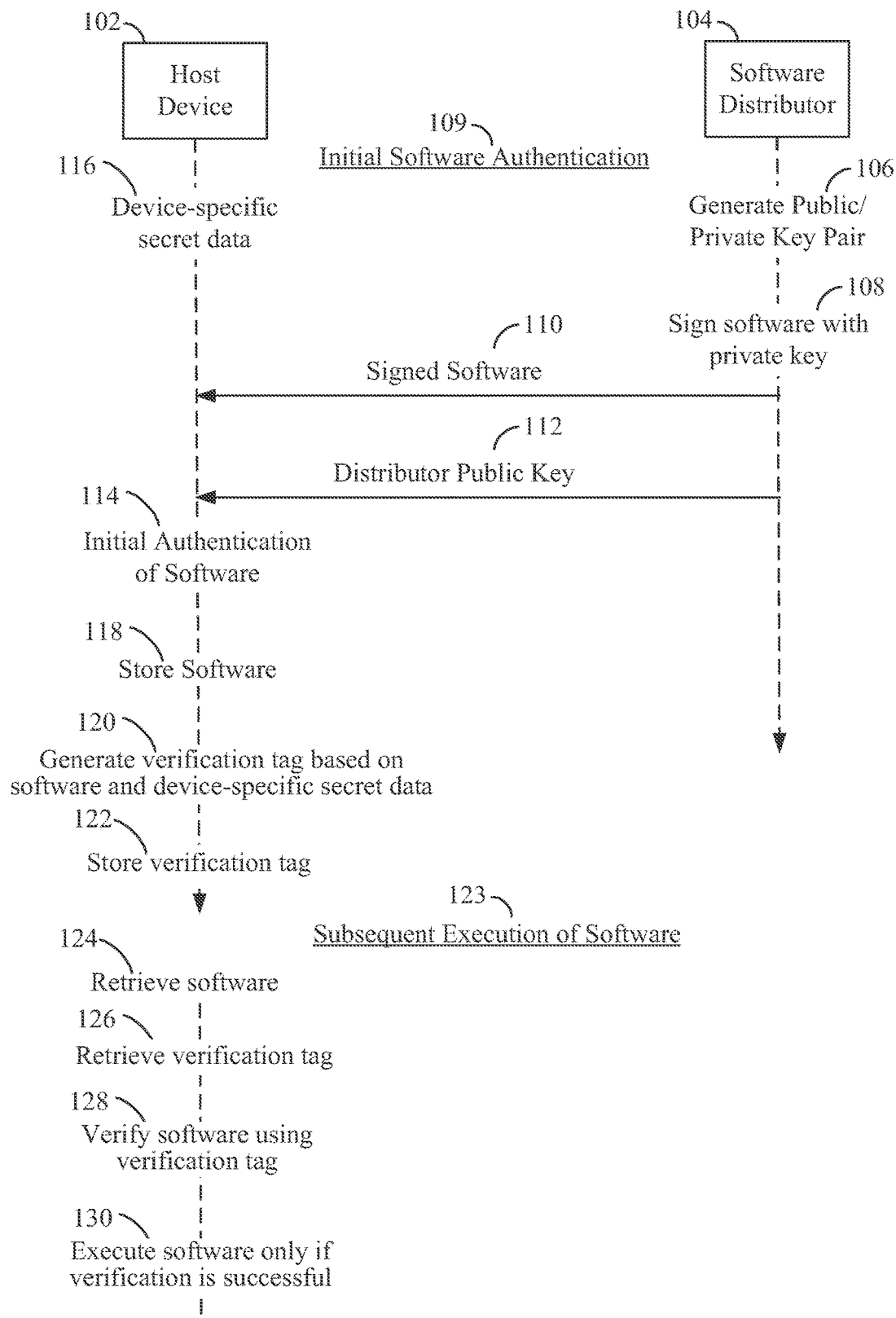
FIG. 1 illustrates an exemplary method for authenticating software on a host device with limited processing resources.

FIG. 1 illustrates an exemplary method for authenticating software on a host device, for example a host device with limited processing resources. A software distributor 104 may generate a public/private key pair 106. Prior to or concurrent with distribution of the software (e.g., a software application, operating system, driver software, executable code/instructions, etc.), the software distributor 104 may cryptographically sign the software with the private key 108. The signed software is then sent 110 to a host device 102 (e.g., a device in which the software will be executed). Additionally, the public key (corresponding to the private key) may be delivered 112 by the software distributor 104 to the host device 102.

Upon reception of the signed software, the host device 102 may perform an initial authentication 109 of the software 114. For example, such initial authentication of the software 114 may involve using the received public key to ascertain that the received signed software is valid or has not been tampered/modified.

The host device 102 may include or obtain device-specific secret data 116. Once the initial authentication is successfully completed, the software may be stored 118 within the host device 102. A verification tag may be generated based on the software and the device-specific secret data 120. Such device-specific secret data 116 may be unknown outside the host device 102. The verification tag may be stored 122 within the host device 102 (e.g., within a non-secure location).

During a subsequent execution of the software 123, the host device 102 may retrieve the software 124. However, prior to execution, the verification tag is also retrieved 126. The software may then be verified using the verification tag 128. That is, the device-specific secret data and retrieved software may be used to generate a new verification tag. The new verification tag may be compared to the previously stored verification tag to ascertain whether they are the same (i.e., successful verification if the new verification tag and the previously stored verification tag are the same). If verification is successful, then the software may be executed 130 by the host device 102. Otherwise, if verification fails, the host device 102 may conclude that the stored software has been modified (e.g., an unauthorized modification of the software).

In one example, the initial authentication of the software may involve a cryptographic authentication using the public key. If the software is successfully authenticated then a message authentication code (MAC) may be generated over the software using the device-specific secret data A MAC may be based on two inputs: a message and a secret key known only to the generator of the message. In one example, the host device may use the software as the message and a device-specific secret data as the secret key. Then, in one example, a MAC may be obtained using a hash function that can be used to map digital data of arbitrary size to digital data of fixed size. The secret data may then be used to bind such MAC to the device and consequently obtain a verification tag.

In contrast to performing cryptographic authentication using the public key which is rather resource intensive, using a verification tag (e.g., a MAC) to verify the software is less resource intensive.

In some examples, the device-specific secret data may include a physically unclonable function (PUF) for the host device 102, a secret key stored within the host device 102, and/or data stored in one or more one-time blowable fuses that may be modified/changed when the software is updated. Note that, once blown, these one-time blowable fuses cannot be unblown or reset.

Exemplary Host Device with Software Authentication

Figure 2:
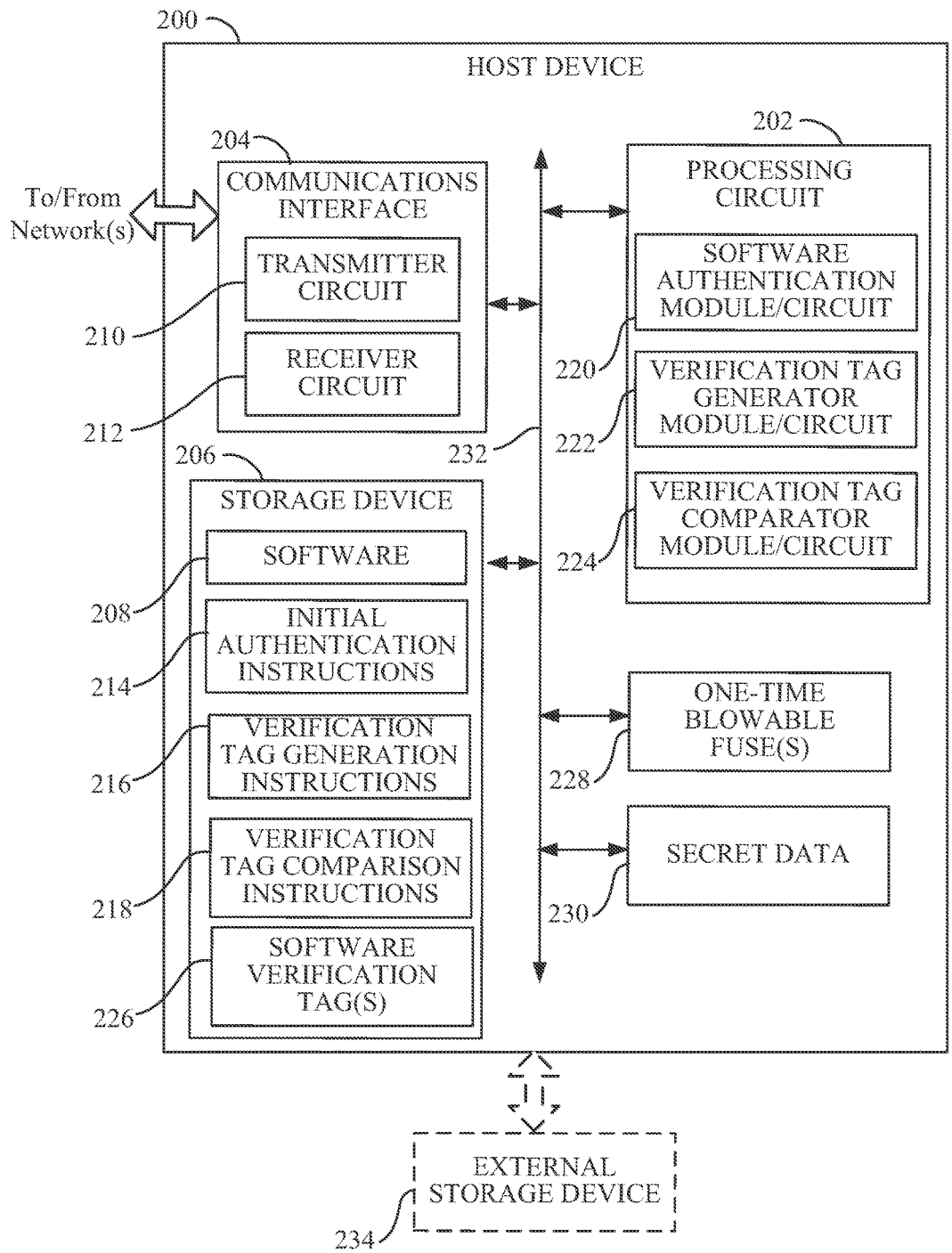
FIG. 2 is a block diagram illustrating an exemplary host device adapted to perform software authentication.

FIG. 2 is a block diagram illustrating an exemplary host device 200 adapted to perform software authentication. The host device 200 may include a processing circuit 202 coupled, via a bus 232, to a communications interface 204 and an internal storage device 206.

The processing circuit 202 may be arranged to obtain, process, and/or send data, control data access and storage, issue commands, and/or control other desired operations of the access device. The processing circuit 202 may comprise circuitry configured to implement desired programming provided by appropriate media in at least one embodiment. For example, the processing circuit 202 may be implemented as one or more of a processor, a controller, a plurality of processors and/or other structure configured to execute executable instructions including, for example, software and/or firmware instructions, and/or hardware circuitry. Embodiments of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 202 are for illustration and other suitable configurations within the scope of the present disclosure are also contemplated.

The communications interface 204 may be configured to facilitate communications to/from the host device 200 via one or more networks. The communications interface 204 may include at least one transmitter circuit 210 and/or at least one receiver circuit 212 (e.g., one or more transmitter/receiver chains). Furthermore, one or more antennas (not shown) may be electrically coupled to the communications interface 204.

The storage device 206 may represent one or more devices for storing programming and/or data, such as processor executable code or instructions (e.g., software, firmware), electronic data, databases, or other digital information. According to at least one embodiment, one or more of such devices may comprise the storage device 206. The storage device 206 may be any available media that can be accessed by a general purpose or special purpose processor. By way of example and not limitation, the storage device 206 may include read-only memory (e.g., ROM, EPROM, EEPROM), random access memory (RAM), magnetic disk storage mediums, optical storage mediums, flash memory devices, and/or other non-transitory computer-readable mediums for storing information. The storage device 206 may be coupled to the processing circuit 202 such that the processing circuit 202 can read information from, and write information to, the storage device 206. In the alternative, the storage device 206, or at least a portion thereof, may be integral to the processing circuit 202 or separate from the processing circuit 202.

In one example, the storage device 206 may include software 208 (e.g., instructions or code that implement an operating system, one or more applications, and/or tasks/functions for the host device 200) to be executed by the processing circuit 202. In other implementations, such software 208 may be stored in an external storage device 234. In various implementations, the software 208 may be stored in a secured storage or a non-secure storage. A secure storage may be a device or storage region that is secured from being accessed by unauthorized users/applications. A non-secured storage (e.g., a device or storage region that may be accessible to the user or unauthorized applications.

According to one aspect, the host device 200 may include initial authentication instructions 214 to authenticate the software 208 when it is loaded for execution by the processing circuit 202. The software 208 may be stored in non-secure storage within the device 20 or external to the device 200. In some instances, verification is always performed first, and if it fails, then authentication is performed. Consequently, the first time a software is used or loaded, verification may be attempted, which may fail since no verification tag has been generated for the software yet. Upon such verification failure, authentication may be performed.

In other instances, the initial authentication instructions 214 may be executed when the software is first loaded for execution on the device 200 or processing circuit 202.

Authentication may involve verifying a cryptographic signature of the software to ascertain the validity, integrity, and/or authenticity of the software.

Upon successful authentication, verification tag generation instructions 216 may serve to generate and store a verification tag 226 that is a function of the software 208 and a device-specific secret data 230. The verification tag 226 may be stored in the storage device 206 or an external storage device 234 (e.g., the same external storage device in which the software 208 is stored or a different external storage device). In various implementations, the verification tags 226 may be stored in a secured storage or a non-secure storage. A secure storage may be a device or storage region that is secured from being accessed by unauthorized users/applications. A non-secured storage (e.g., a device or storage region that may be accessible to the user or unauthorized applications.

On subsequent executions or loading of the same software 208 by the host device 200, the initial authentication process is avoided. Instead, verification tag comparison instructions 218 may verify that the verification tag previously stored for the software matches a new version of the verification tag of the software being retrieved for execution. Note that each software (e.g., operating system, driver, user application, etc.) may have a different verification tag associated with it. Upon successful verification of the tag, the software 208 may be executed.

In on example, the host device 200 may be configured to perform an initial authentication of the software 208 as it is loaded or prior to execution. A software authentication module/circuit 220 may be adapted to perform an initial authentication of the software 208 (and/or subsequent authentications of the software) when the software 208 is loaded or used by the host device 200 in accordance with the initial authentication instructions 214 stored in the storage device 206. If authentication is successful, the verification tag generator module/circuit 222 may be adapted to create, generate, and/or obtain a verification tag for the software 208 by computing a value (e.g., message authentication code or MAC) over the software 208 (e.g., over the software code) using or secured by a secret data 230. The software verification tag 226 may then be stored in the storage device 206.

In subsequent loading or executions of the same software the host device 200 need not perform authentication of the software again. Rather, a verification tag comparator module/circuit 224 may merely perform verification of the previously stored verification tag 226 to ascertain whether the software 208 has changed or been modified.

Note that verifying the software may be less time consuming and/or less resource intensive than authenticating the software. Consequently, efficiency is gained by performing the software verification rather than performing software authentication.

According to one aspect, upon updating of the software 208, a new verification tag may be generated. To guarantee that an old verification tag will not be reused, one-time blowable fuses 228 may be used in the generation of the verification tag. Each time the software 208 is updated or changed, then it is reauthenticated of the software is performed and a new verification tag is generated as a function of the one-time blowable fuse(s) 228 and/or the secret data 230. The one-time blowable fuse(s) 228 may be changed (e.g., one or more fuses are blown) every time a software update occurs. This guarantees that the verification tag will change each time the software is updated.

In one aspect, if software verification using the verification tag fails, then the host device 200 may revert to performing authentication of the software using the public key.

First Exemplary Method for Software Authentication and Verification

Figure 3:
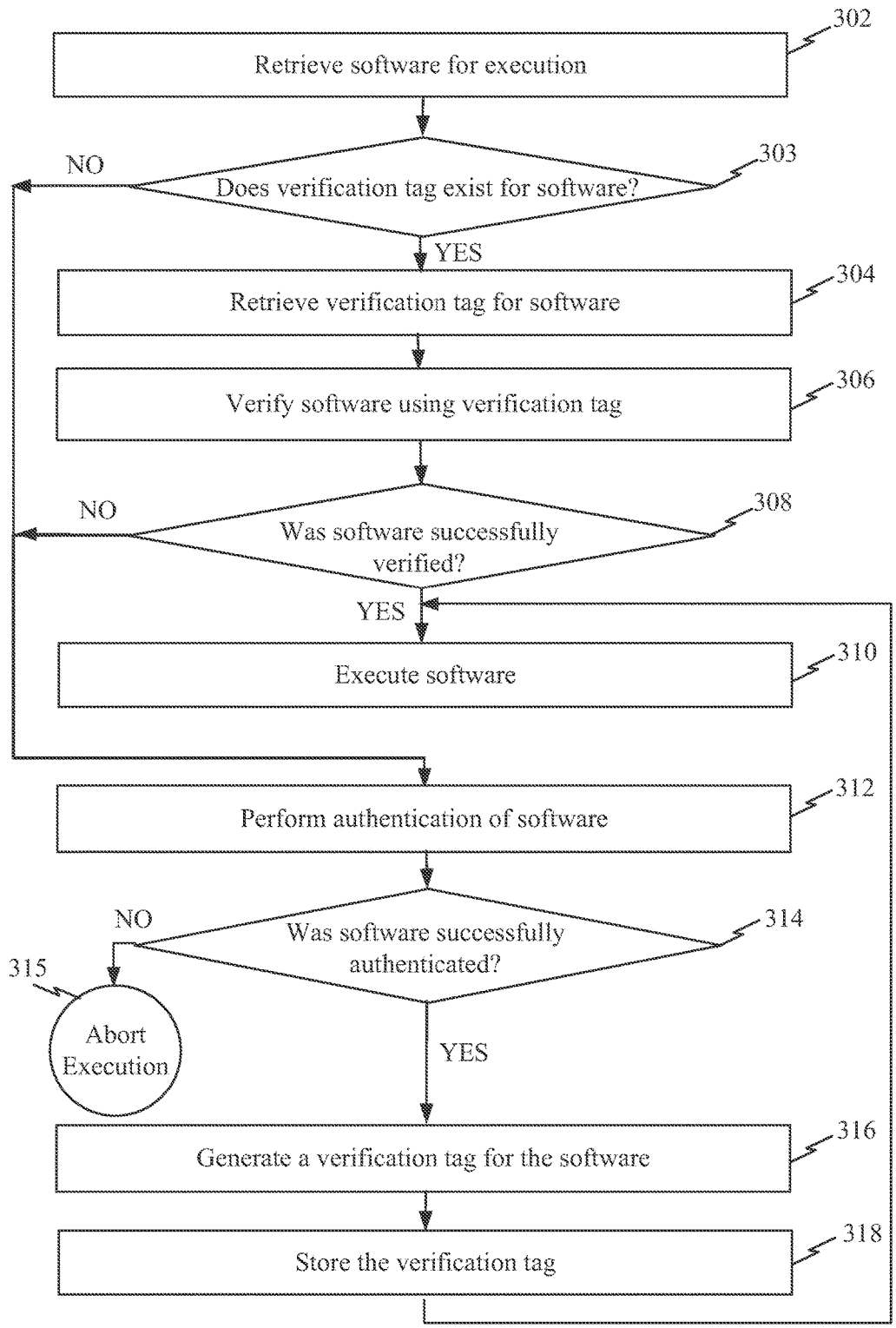
FIG. 3 illustrates a first exemplary method for performing a hybrid software authentication and verification.

According to a first exemplary implementation, for devices without secure internal or trusted persistent storage, a secure boot process may involve attempting to verify the software and, if such verification fails, then attempting to authenticate the software. FIG. 3 illustrates a first general method for performing a hybrid software authentication and verification. The software is retrieved, received, and/or obtained 302 by the device. For instance, the software may be a particular boot image of software.

When the software is loaded for execution or use on the device, an attempt is made to verify the software against a verification tag. In one example, a determination may be made as to whether a verification tag already exist (on the device) for the software 303. If the software was previously authenticated on the device, then a verification tag for the software may be found and retrieved 304. The software may then be verified using the verification tag 306. In one example, a newly generated verification tag for the software may be obtained and compared to the retrieved verification tag. If the software is successfully verified 308, then the software is executed 310.

If no verification tag for the software exists 303 and/or if the software verification fails 308, then authentication of the software may be performed 312. In one example, authenticating the software 312 may include authenticating a digital signature of the software using, for example, a public key provided by a software distributor. If the software is successfully authenticated 314, then a verification tag is generated for the software 316. The verification tag may then be stored 318, for instance, in secure or non-secure storage within the device or external to the device. Otherwise, if software authentication 314 fails, then execution of the software is aborted 315. The software may then be executed 320.

According to one example, the verification tag may be generated as a function of the software and an embedded secret data or functional equivalent (e.g., a physically unclonable function). This verification tag may be used to optimize subsequent execution of the software (e.g., boot time verification of software after the first boot). In one example, the verification tag may include a message authentication code (MAC) over an authenticated image of the software using or bound by a device-specific secret key (i.e., known only to the device).

In one example, the use of the verification tag (e.g., MAC) in combination with or bound by the secret data is significantly more efficient than authenticating a digital signature for the software using a public key. Note that the verification tag may be signed or bound by the secret data and can be stored in any location (including insecure or non-secure storage within the device). When the software is subsequently loaded or used, it generates a new verification tag (e.g., a new MAC) for the software being loaded and compares it to the previously stored verification tag (e.g., MAC). If the stored verification tag is tampered with, verifying using the secret data will cause it to fail when compared to the new verification tag.

Second Exemplary Method for Software Authentication and Verification

Figure 4A:
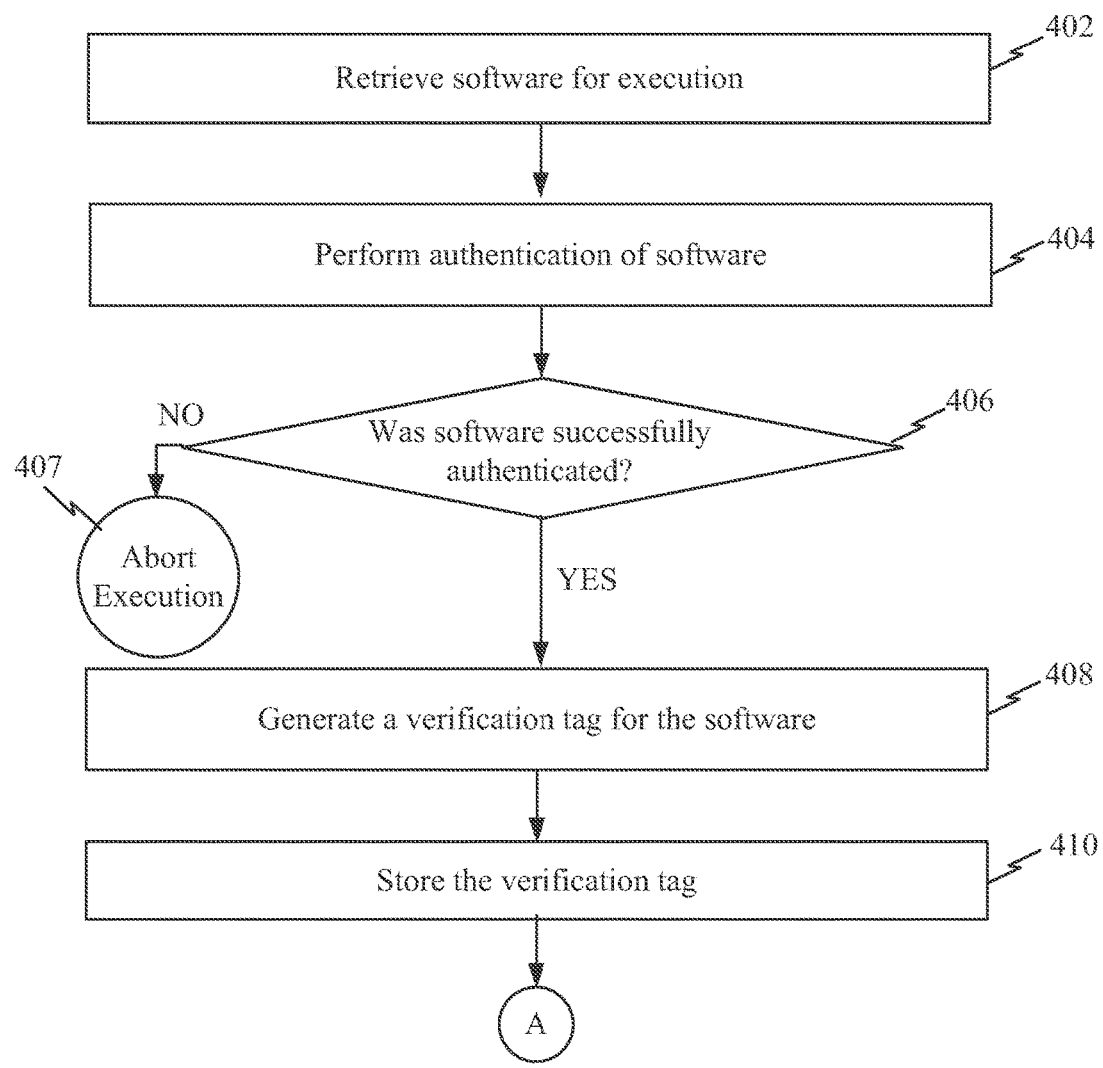
FIG. 4 (comprising FIGS. 4A and 4B) illustrates a second exemplary method for performing a hybrid software authentication and verification.
Figure 4B:
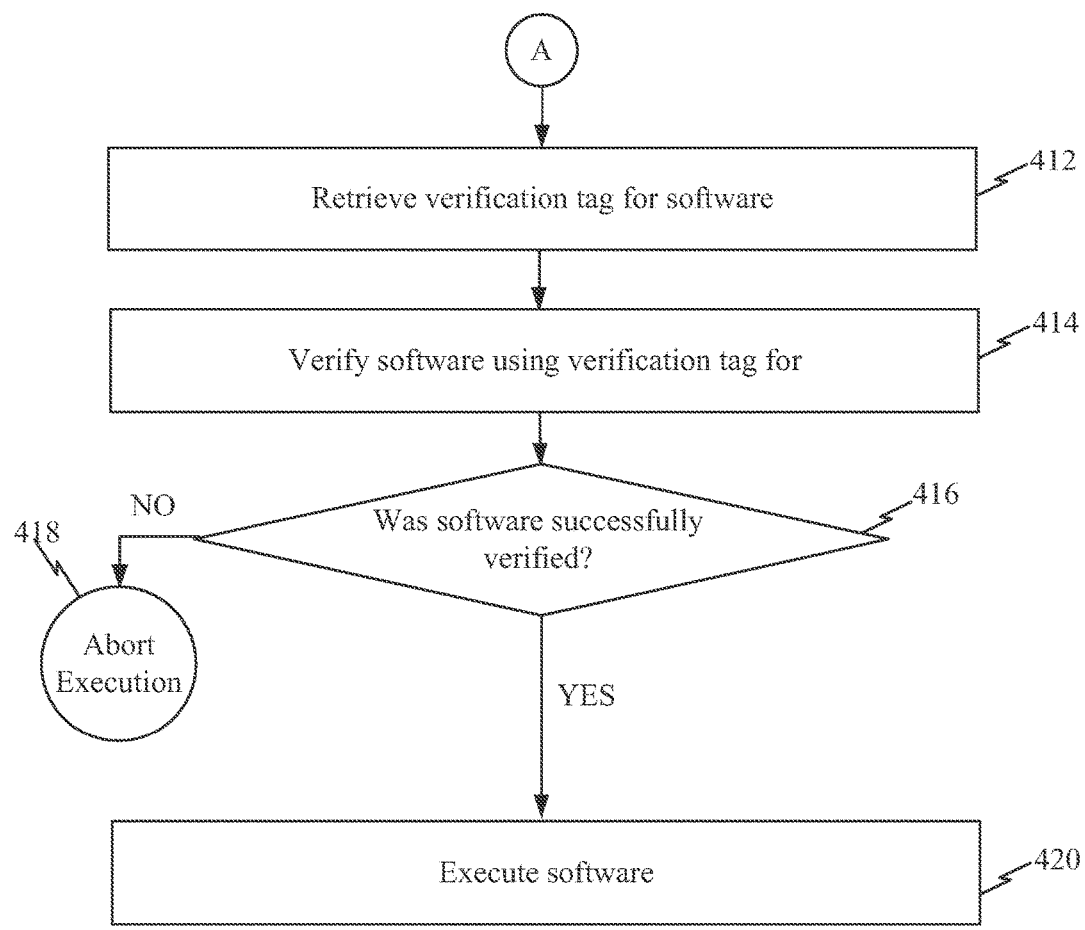

FIG. 4 (comprising FIGS. 4A and 4B) illustrates a second general method for performing a hybrid software authentication and verification. The software is retrieved, received, and/or obtained 402 by the device. Authentication of the software is then performed 404, for example, as it is loaded into the device. In one example, authenticating the software may include authenticating a digital signature of the software using, for example, a public key provided by a software distributor. If the software is successfully authenticated 406, then a verification tag is generated for the software 408. The verification tag may then be stored 410, for instance, in a secure or non-secure storage within the device or external to the device. Otherwise, if software authentication 406 fails, then execution of the software is aborted 407.

Subsequently, when the software is being loaded on or used by the device, the verification tag for the software is retrieved 412. According to one example, the software and an embedded secret data or functional equivalent (e.g., a physically unclonable function) may be used to generate the verification tag. This verification tag may be used to optimize subsequent execution of the software (e.g., boot time verification of software after the first boot). In one example, the verification tag may include a message authentication code (MAC) over an authenticated image of the software using or bound by a device-specific secret key (i.e., known only to the device).

The software is then verified using the verification tag 414 (e.g., by comparing the retrieved verification tag to a newly generated verification tag for the software). If the software is successfully verified 416, then the software is executed 420, otherwise, software execution is aborted 418.

In a more general sense, the verification tag may be any value that combines a characteristic of the software and the secret data. For example, the verification tag may be a hash of over the software which is then secured by the secret data. In another example, bits of the software and secret key are combined in such a way as to permit subsequent verification.

Another aspect provides an anti-rollback feature so an attacker cannot simply update a storage (flash) of a host device with the old image of the software. Such an attack would perform authentication using the public key provided by the software distributor, which would fail if the software has been compromised. However, the attacker might also save an old verification tag (from a previous version of the installed software). If the attacker can get the verification tag to work with a modified version of the software, the full authentication process can be bypassed. However, an anti-rollback feature may use anti-rollback fuses (or equivalent) as part of inputs that are used in the verification tag generation function. Every time the software is updated, another fuse may be blown so that any previous verification tag cannot be replicated since the fuse states (which serve as input to the verification tag generation) have changed. This prevents the old image of the software and verification tag from working.

Third Exemplary Method for Software Authentication and Verification

Figure 5:
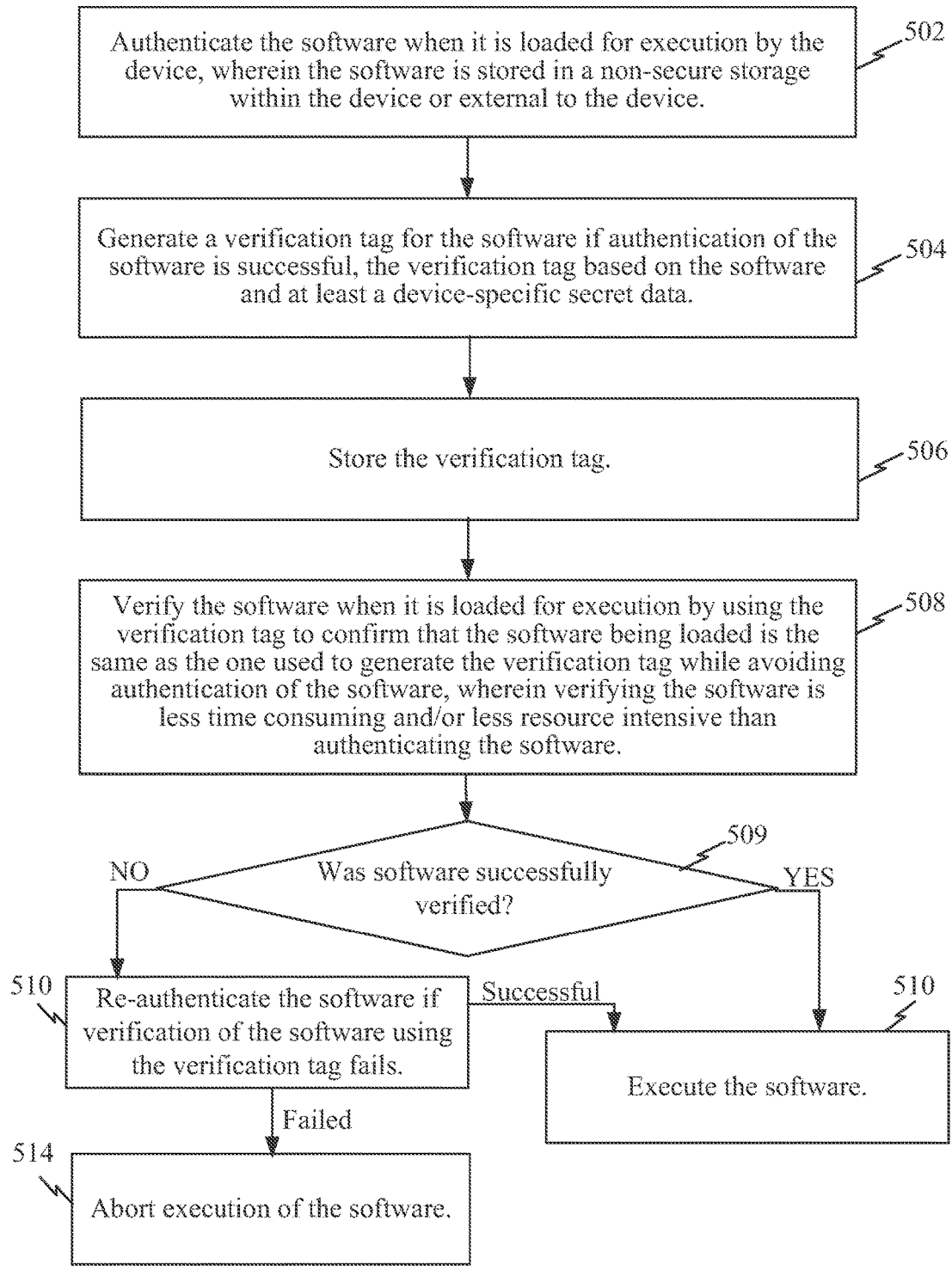
FIG. 5 illustrates a third exemplary method for verifying software during loading within a device.

FIG. 5 illustrates another exemplary method for verifying software during loading within a device. The software may be stored within the device or external to the device, in secure or non-secure storage. The software may be authenticated when it is loaded for execution by the device, wherein the software is stored in anon-secure storage within the device or external to the device 502. Authenticating the software may involve a cryptographic operation over the software and a digital signature of the software. For example, authenticating the software may include using a public key provided by a software distributor to authenticate the software using a signature over the software. Note that the software distributor may be a party or entity that either creates or distributes the software. The software may be part of an operating system being loaded at boot time of the device.

A verification tag may be generated for the software if authentication of the software is successful, the verification tag based on the software and at least a device-specific secret data 504. The verification tag may be stored 506. For instance, the verification tag may be stored within the device or external to the device, in secure or non-secure storage. In one example, generating the verification tag may include generating a message authentication code (MAC) over the software and using the device-specific secret data. In another example, the verification tag may be a hash of the software which is then secured or bound to secret data. In various examples, the secret data may be known only to the device and/or may be inaccessible outside the device. The secret data may also be obtained based on a physically unclonable function (PUF) within the device.

Subsequently, the software may be verified (not authenticated) when it is loaded for execution by using the verification tag to confirm that the software being loaded is the same as the one used to generate the verification tag while avoiding authentication of the software, wherein verifying the software is less time consuming and/or less resource intensive than authenticating the software 508.

The verification tag may be further generated based on device data that changes every time a new version of the software is obtained. The device data never repeats when generating a new verification tag for software in the device.

Authenticating the software may consume greater processing resources of the device or time than verifying the software.

In one example, if verification of the software using the verification tag fails 509, then re-authentication of the software is attempted 510. The software is executed 512 only if the re-authentication 510 is successful. Otherwise, if re-authentication of the software fails, execution of the software is aborted 514.

According to one aspect, rather than authenticating the software when it is loaded, a device may attempt to perform verification with one or more of pre-existing verification tags that may be available to it. If such verification fails or no verification tags are available, then authentication is performed over the software.

In another aspect, a new version of the software may be obtained. The new version of the software is authenticated when the new version of the software is loaded for execution by the device. A new verification tag is generated for the software if authentication of the new version of the software is successful, the new verification tag based on the new version of the software and at least the device-specific secret data. The new verification tag is stored (e.g., within the device or external to the device). Subsequently, the new version of the software may be verified when the new version of the software is loaded for execution by using the new verification tag to confirm that the new version of the software being loaded is the same as the one used to generate the new verification tag while avoiding re-authentication of the new version of the software. Note that verifying the new version of the software may be less time consuming and/or less resource intensive than re-authenticating the new version of the software.

Fourth Exemplary Method for Software Authentication and Verification

Figure 6:
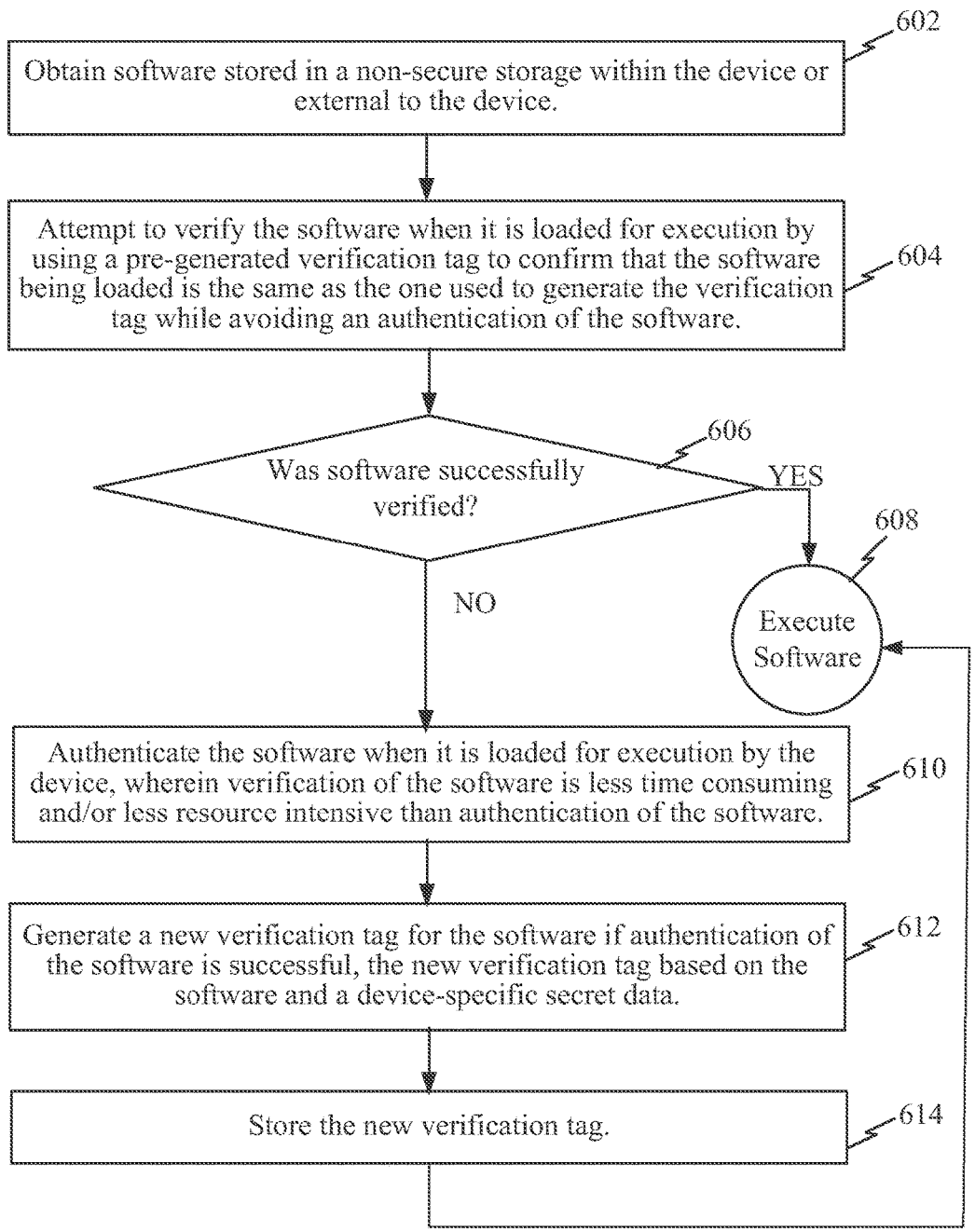
FIG. 6 illustrates a fourth exemplary method for verifying software during loading within a device.

FIG. 6 illustrates yet another exemplary method for verifying software during loading within a device. A software stored in a non-secure storage within the device or external to the device is obtained 602. In one example, the software may be part of an operating system being loaded at boot time of the device. When the software is loaded for execution, an attempt may be made to verify the software by using a pre-generated verification tag to confirm that the software being loaded is the same as the one used to generate the pre-generated verification tag while avoiding an authentication of the software 604. The pre-generated verification tag may be obtained from a previous authentication of the software. If such verification is successful 606, then the software is executed 608.

Otherwise, if verification fails or no pre-generated verification tag is available, then the software is authenticated when it is loaded for execution by the device 610. Note that verifying the software may be less time consuming and/or less resource intensive than authenticating the software. If authentication of the software is successful, a new verification tag for the software is generated based on the software and a device-specific secret data 612. The secret data may be known only to the device and/or is inaccessible outside the device. For instance, the secret data may be obtained based on a physically unclonable function within the device. The new verification tag may then be stored 614. In some examples, the pre-generated verification tag and/or the new verification tag may be stored in the non-secure storage or a different non-secure storage within the device or external to the device.

In one example, the software may be authenticated and, upon successful authentication, the pre-generated (e.g., initial, first, prior, etc.) verification tag may be generated. The pre-generated verification tag may be stored for use in the subsequent verification of the software.

In one example, authenticating the software may involve a cryptographic operation over the software and a cryptographic signature of the software. For instance, authenticating the software may include using a public key to authenticate the software using a signature over the software.

In another example, generating the new verification tag may include generating a message authentication code (MAC) over the software and using the device-specific secret data.

In some implementations, the new verification tag may be further generated based on device data that changes every time a new version of the software is obtained. The device data may never repeat when generating a new verification tag for software in the device.

If authentication of the software fails, execution of the software is aborted. In one implementation, the software is executed only if the verification of the software is successful or the authentication of the software is successful.

A new version of the software may be obtained. The new version of the software may be authenticated when it is loaded for execution by the device. If authentication of the new version of the software is successful, another verification tag is generated for the new version of the software, where the another verification tag may be based on the new version of the software and at least the device-specific secret data or another device-specific data. The another verification tag may also be stored for subsequent use. Subsequently, the new version of the software may be verified when it is loaded for execution by using the another verification tag to confirm that the new version of the software being loaded is the same as the one used to generate the another verification tag while avoiding a re-authentication of the new version of the software.

According to another aspect, the verification tag may be further bound by a revocable certificate that may serve to disable a verification tag. For instance, the revocable certificate may be checked by the device upon performing verification. The device may query a certificate revocation database, and verification would fail if the certificate has be revoked. So, even if the software has not been modified, verification would still fail if the corresponding certificate has been revoked.

Another example provides a device, such as the host device 200 configured to perform a hybrid software authentication and verification prior to execution. The device 200 (FIG. 2) may be provided comprising a storage device 206 and a processing circuit 202. The storage device 206 may serve to store authentication instructions 214 and/or verification tag generation instructions 216 and verification tag comparison instructions 218. The processing circuit 202 may be configured to obtain (e.g., retrieve, read, etc., via a bus 232 or from the communications interface 204) software stored in a non-secure storage within the device 200 or external to the device 200.

The verification tag comparator module/circuit 224 may serve to attempt to verify the software when it is loaded for execution by using a pre-generated verification tag (e.g., stored among software verification tags 226) to confirm that the software being loaded is the same as the one used to generate the verification tag while avoiding an authentication of the software. If verification fails or no pre-generated verification tag is available, then the software authentication module/circuit 220 may serve to authenticate the software when it is loaded for execution by the device. If authentication of the software is successful, the verification tag generator module/circuit 222 may serve to generate a new verification tag for the software based on the software and a device-specific secret data. The new verification tag may then be stored among the software verification tag(s) 226. This process achieves improvements in efficiency as verification of the software is less time consuming and/or less resource intensive than authentication of the software. Consequently, even though authentication may consume more time or resource initially, subsequent loadings of the software are more prompt and efficient due to using verification instead of authentication.

The device may also include a plurality of one-time blow fuses 228 coupled to the processing circuit, wherein the new verification tag and/or pre-generated verification tag is further generated based on states from the one-time blow fuses, and the plurality of one-time blow fuses change every time an updated version of the software is obtained.

One or more of the components, steps, features and/or functions illustrated in FIGS. 1, 2, 3, 4, 5 and/or 6 may be rearranged and/or combined into a single component, step, feature or function or embodied in several components, steps, or functions. Additional elements, components, steps, and/or functions may also be added without departing from the scope of the present disclosure. The apparatus, devices and/or components illustrated in FIG. 2 may be configured to perform one or more of the methods, features, or steps described in FIGS. 1, 3, 4, 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for verifying software during loading within a device, comprising:
   obtaining, at the device, software stored in a non-secure storage within the device or external to the device;
   attempting to verify, at a verification tag comparator circuit of the device, the software when it is loaded for execution by using a pre-generated verification tag to confirm that the software being loaded is the same as the one used to generate the pre-generated verification tag while avoiding an authentication of the software;
   if verification fails or no pre-generated verification tag is available, then
      authenticating, at a software authentication circuit, the software when it is loaded for execution by the device,
      generating, at a verification tag generator circuit of the device, a new verification tag for the software if authentication of the software is successful, the new verification tag based on the software, device-specific secret data, and device data including one or more states from one or more one-time blowable fuses, wherein at least one of the one or more one-time blowable fuses is blown to change the device data every time a new version of the software is obtained, and
      storing, at a storage device, the new verification tag; and
   wherein verifying the software is less time consuming and/or less resource intensive than authenticating the software.

2. The method of claim 1, wherein the pre-generated verification tag is obtained from a previous authentication of the software.

3. The method of claim 1, further comprising:
   authenticating, at the software authentication circuit, the software and generating, at the verification tag generator circuit, the pre-generated verification tag; and
   storing, at the storage device, the pre-generated verification tag for use in the subsequent verification of the software.

4. The method of claim 1, wherein authenticating the software involves a cryptographic operation over the software and a cryptographic signature of the software.

5. The method of claim 1, wherein authenticating the software includes using a public key to authenticate the software using a signature over the software.

6. The method of claim 1, wherein generating the new verification tag includes generating a message authentication code (MAC) over the software and using the device-specific secret data.

7. The method of claim 1, wherein the device-specific secret data is known only to the device.

8. The method of claim 1, wherein the device-specific secret data is inaccessible outside the device.

9. The method of claim 1, wherein the pre-generated verification tag and/or the new verification tag is stored in the non-secure storage or a different non-secure storage within the device or external to the device.

10. The method of claim 1, wherein the software is part of an operating system being loaded at boot time of the device.

11. The method of claim 1, wherein the device-specific secret data is obtained based on a physically unclonable function within the device.

12. The method of claim 1, further comprising:
aborting, at the device, execution of the software if authentication of the software fails.

13. The method of claim 1, further comprising:
executing, at the device, the software if the authentication of the software is successful.

14. The method of claim 1, further comprising:
obtaining, at the device, a new version of the software;
authenticating, at the software authentication circuit, the new version of the software when it is loaded for execution by the device,
generating, at the verification tag generator circuit, another verification tag for the new version of the software if authentication of the new version of the software is successful, the another verification tag based on the new version of the software, the device-specific secret data, and changed device data, and
storing, at the storage device, the another verification tag.

15. The method of claim 14, further comprising:
attempting to verify, at the verification tag comparator circuit, the new version of the software when it is loaded for execution by using the another verification tag to confirm that the new version of the software being loaded is the same as the one used to generate the another verification tag while avoiding an re-authentication of the new version of the software.

16. The method of claim 14, wherein the new verification tag is further based on a revocable certificate, and the method further comprising:
ascertaining, at the device, whether then revocable certificate is still valid prior to executing the software.

17. A device, comprising:
a storage device for storing authentication and verification instructions;
a processing circuit coupled to the storage device, the processing circuit configured to:
obtain software stored in a non-secure storage within the device or external to the device;
attempt to verify the software when it is loaded for execution by using a pre-generated verification tag to confirm that the software being loaded is the same as the one used to generate the pre-generated verification tag while avoiding an authentication of the software;
if verification fails or no pre-generated verification tag is available, then authenticate the software when it is loaded for execution by the device,
generate a new verification tag for the software if authentication of the software is successful, the new verification tag based on the software, device-specific secret data, and device data including one or more states from one or more one-time blowable fuses, wherein at least one of the one or more one-time blowable fuses is blown to change the device data every time a new version of the software is obtained, and
store the new verification tag; and
wherein verification of the software is less time consuming and/or less resource intensive than authentication of the software.

18. The device of claim 17, wherein the processing circuit is further configured to:
authenticate the software and generate the pre-generated verification tag; and
store the pre-generated verification tag for use in the subsequent verification of the software.

19. The device of claim 17, wherein the pre-generated verification tag and/or the new verification tag is stored in the non-secure storage or a different non-secure storage within the device or external to the device.

20. The device of claim 17, wherein the device-specific secret data is unknown and inaccessible outside the device.

21. A device, comprising:
means for obtaining software stored in a non-secure storage within the device or external to the device;
means for attempting to verify a software when it is loaded for execution by using a pre-generated verification tag to confirm that the software being loaded is the same as the one used to generate the pre-generated verification tag while avoiding an authentication of the software;
means for authenticating the software, if verification fails or no pre-generated verification tag is available, when it is loaded for execution by the device;
means for generating a new verification tag for the software if authentication of the software is successful, the new verification tag based on the software, device-specific secret data, and device data including one or more states from one or more one-time blowable fuses, wherein at least one of the one or more one-time blowable fuses is blown to change the device data every time a new version of the software is obtained, and
means for storing the new verification tag; and
wherein verifying the software is less time consuming and/or less resource intensive than authenticating the software.

22. A device, comprising:
a storage device for storing authentication and verification instructions;
a processing circuit coupled to the storage device, the processing circuit configured to:
obtain software stored in a non-secure storage within the device or external to the device;
attempt to verify the software when it is loaded for execution by using a pre-generated verification tag to confirm that the software being loaded is the same as the one used to generate the pre-generated verification tag while avoiding an authentication of the software;
if verification fails or no pre-generated verification tag is available, then authenticate the software when it is loaded for execution by the device,
generate a new verification tag for the software if authentication of the software is successful, the new verification tag based on the software, device-specific secret data, and device data including one or more states from one or more hardware components, wherein the device data changes every time a new version of the software is obtained, and wherein the device data is not repeated when the new verification tag is generated, and
store the new verification tag; and
wherein verification of the software is less time consuming and/or less resource intensive than authentication of the software.

* * * * *